US008600985B2

(12) United States Patent  
Chen et al.

(10) Patent No.: US 8,600,985 B2  
(45) Date of Patent: *Dec. 3, 2013

(54) CLASSIFYING DOCUMENTS ACCORDING TO READERSHIP

(75) Inventors: Ying Chen, San Jose, CA (US); Bin He, San Jose, CA (US); William S. Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/473,136

(22) Filed: May 16, 2012

(65) Prior Publication Data

US 2012/0226695 A1  Sep. 6, 2012

Related U.S. Application Data

(63) Continuation of application No. 12/776,779, filed on May 10, 2010, now Pat. No. 8,244,724.

(51) Int. Cl.  
*G06F 17/30* (2006.01)

(52) U.S. Cl.  
USPC ........... 707/727; 707/706; 707/713; 707/722; 707/723; 707/736; 707/758; 707/781; 707/822; 709/207; 726/23

(58) Field of Classification Search  
USPC ......... 707/706, 713, 722, 723, 736, 758, 781, 707/822; 709/207; 726/23  
See application file for complete search history.

(56) References Cited

U.S. PATENT DOCUMENTS

| | | | |
|---|---|---|---|
| 2002/0120702 A1 | 8/2002 | Schiavone et al. | |
| 2005/0203970 A1 | 9/2005 | McKeown et al. | |
| 2006/0230012 A1 | 10/2006 | Ruvolo et al. | |
| 2006/0242098 A1 | 10/2006 | Wnek | |
| 2006/0248074 A1 | 11/2006 | Carmel et al. | |
| 2007/0078939 A1 | 4/2007 | Kallen | |
| 2007/0217693 A1 | 9/2007 | Kretzschmar Jr. | |
| 2008/0010274 A1 | 1/2008 | Carus et al. | |
| 2009/0106206 A1 | 4/2009 | Sherman | |
| 2009/0119275 A1 | 5/2009 | Chen et al. | |
| 2011/0276553 A1 | 11/2011 | Chen et al. | |

OTHER PUBLICATIONS

Luz Marina Quiroga et al., "Empirical Evaluation of Explicit Versus Implicit Acquisition of User Profiles in Information Filtering Systems," Proceedings of the Fourth ACM Conference on Digital Libraries; pp. 238-239; 1999.

Daniela Godoy et al, "User Profiling for Web Page Filtering," Web User Agents; IEEE Internet Computing; pp. 1-9; 2005.

G. Specht et al., "Information Filtering and Personalisation in Databases using Gaussian Curves," KnowledgeGate from IBM Market Insights; pp. 16-24; IEEE 2000.

*Primary Examiner* — Syling Yen  
(74) *Attorney, Agent, or Firm* — Cantor Colburn LLP (57) ABSTRACT

A system for classifying documents in a collection of documents according to their intended readerships includes: a computer configured to select a document in the collection of documents; and a computer to determine a characteristic of the selected document, the characteristic being: misleading when the document includes one or more features that are determined to be for a purpose other than reading the document; commercial when the document includes features that are presented for a commercial purpose; or personal when the document includes features of a personal opinion. A computer classifies the selected document as misleading, commercial, or personal according to its determined characteristic; and a computer repeats the steps of select document, determines a characteristic of the selected document, and classifies the selected document for additional documents in the collection. At least some documents are classified as misleading, some as commercial, and at least some as personal.

4 Claims, 6 Drawing Sheets

CLASSIFYING DOCUMENTS ACCORDING TO READERSHIP

CROSS-REFERENCE TO RELATED APPLICATION

This application is a continuation of U.S. patent application Ser. No. 12/776,779, filed May 10, 2010, now U.S. Pat. No. 8,244,724, the disclosure of which is incorporated by reference herein in its entirety.

BACKGROUND OF THE INVENTION

1. Field of the Invention

The present invention relates generally to classifying documents, and more particularly, to classifying documents independent of subject.

2. Background Information

The growth of enterprises and Internet accessible websites, referred to herein as "the Web" or Internet, has generated a huge amount of data, which are contained in documents, including call center data documents, blog data documents, and other such documents. Thus, text analytics has become an important research area with potentially great business potential. For instance, sentiment analysis can help a company understand customers' opinions about their products and services. However, since documents are often written by various people for different intended readers, applying one analysis to a collection documents may result in a distorted analysis result. Therefore, identifying document readership may ensure proper results for many text analysis tasks.

SUMMARY OF THE INVENTION

One embodiment is a computer-implemented method for classifying documents in a collection of documents according to their intended readerships. The method comprises using a computer to select a document in the collection of documents; and using a computer to determine a characteristic of the selected document, the characteristic being: misleading when the document includes one or more features that are determined to be for a purpose other than reading the document; commercial when the document includes features that are presented for a commercial purpose; or personal when the document includes features of a personal opinion. The method further includes using a computer to classify the selected document as misleading, commercial, or personal according to its determined characteristic; and using a computer to repeat the steps of select document, determine a characteristic of the selected document, and classify the selected document for additional documents in the collection. At least some documents are classified as misleading, at least some documents are classified as commercial, and at least some documents are classified as personal.

Another embodiment is a computer-implemented method for classifying documents according to their intended readerships. The method includes executing program instructions on a computer to select a document in the collection of documents; and executing program instructions on the computer to determine an intended readership of the selected document, the readership being: search engine readership; customer readership; or peer readership. The method also includes executing program instructions on the computer to classify the selected document as search engine readership, customer readership, or peer readership according to its determined characteristic; and executing program instructions on the computer to repeat the steps of select a document, determine an intended readership of the selected document, and classify the selected document for additional documents in the collection. At least some documents of the collection are classified as search engine readership, at least some documents are classified as customer readership, and at least some documents are classified as peer readership.

Another embodiment is computer program product for classifying documents in a collection of documents according to their intended readerships. The computer program product comprises a computer readable storage medium having computer readable program code embodied therewith. The computer readable program code is configured to select a document in the collection of documents; and computer readable program code configured to determine a characteristic of the selected document, the characteristic being: misleading when the document includes features that are determined to be for a purpose other than reading the document; commercial when the document includes features that are presented for a legitimate commercial purpose; or personal when the document includes features of a personal opinion. The product further includes computer readable program code configured to classify the document as misleading, commercial, or personal according to its determined characteristic; and computer readable program code configured to repeat the steps of select a document, determine a characteristic of the selected document, and classify the selected document for additional documents in the collection. At least some documents are classified as misleading, at least some documents are classified as commercial, and at least some documents are classified as personal.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The embodiments described below disclose methods and computer program products for classifying documents according to their intended readerships without relying on the document's general subject. Some embodiments are related to techniques for classifying documents according to their intended readerships only. Analyzing information in text documents (e.g., Web pages, search results, spreadsheets, etc.) can be important for enterprise business decisions. Classifying documents according to their intended readerships is a new topic that has many applications but has not been extensively studied. Readership classification can be used as a preprocessing step for many text-based analytical tasks.

For example, a classification or clustering algorithm may operate more efficiently and effectively if it first filters out documents that are specifically written for search engines, since such documents do not contain meaningful information. Also, sentiment analysis may not be interested in documents written for attracting customers, since such documents always say good words about a corporation's products or services, and do not include objective viewpoints.

According to some approaches, an efficient subject-independent readership classification method is provided to realize such a goal. Experiments on real Web data indicate a high accuracy and efficiency of the methods presented herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
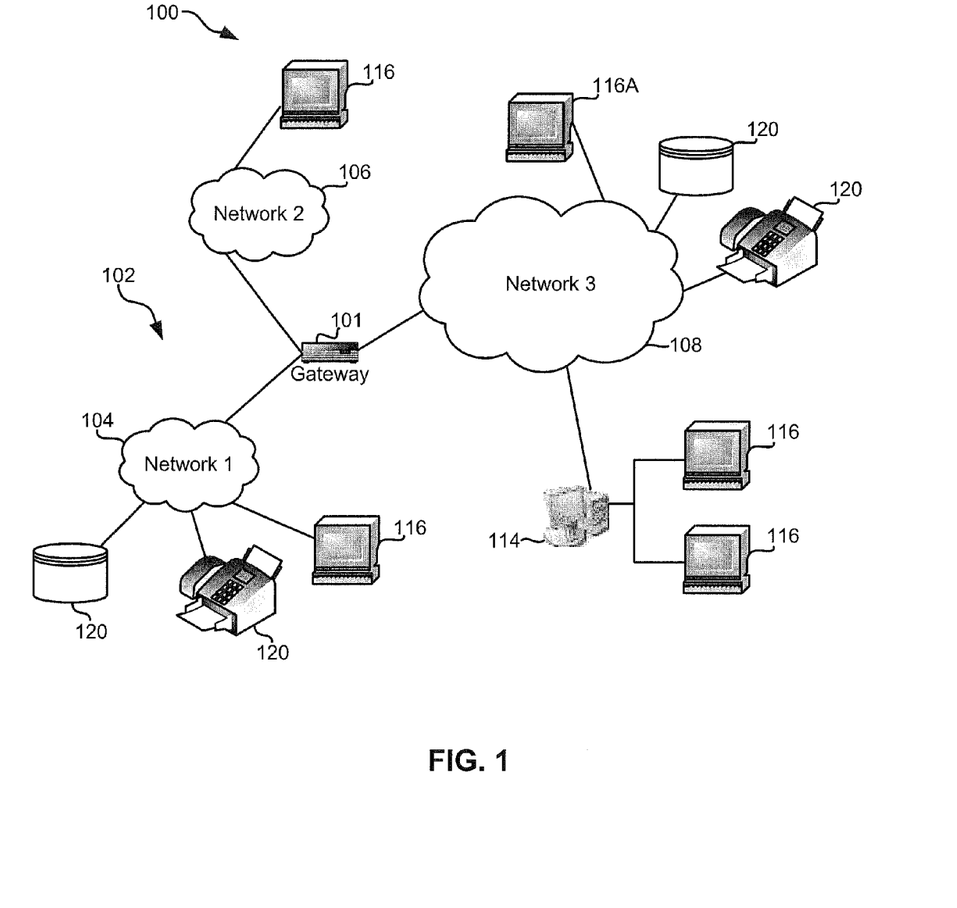
FIG. 1 illustrates a network architecture, in accordance with one embodiment.

FIG. 1 illustrates a network architecture shown generally at 100, in accordance with one embodiment. A plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108. The least one data server 114 is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer, or any other type of similar logic device. In one embodiment, a user device 116A may be directly coupled to any of the networks.

A peripheral 120, which may comprise a series of peripherals 120, that may include, but is not limited, facsimile machines, printers, networked and/or local storage units or systems, and other such peripherals, may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

Figure 2:
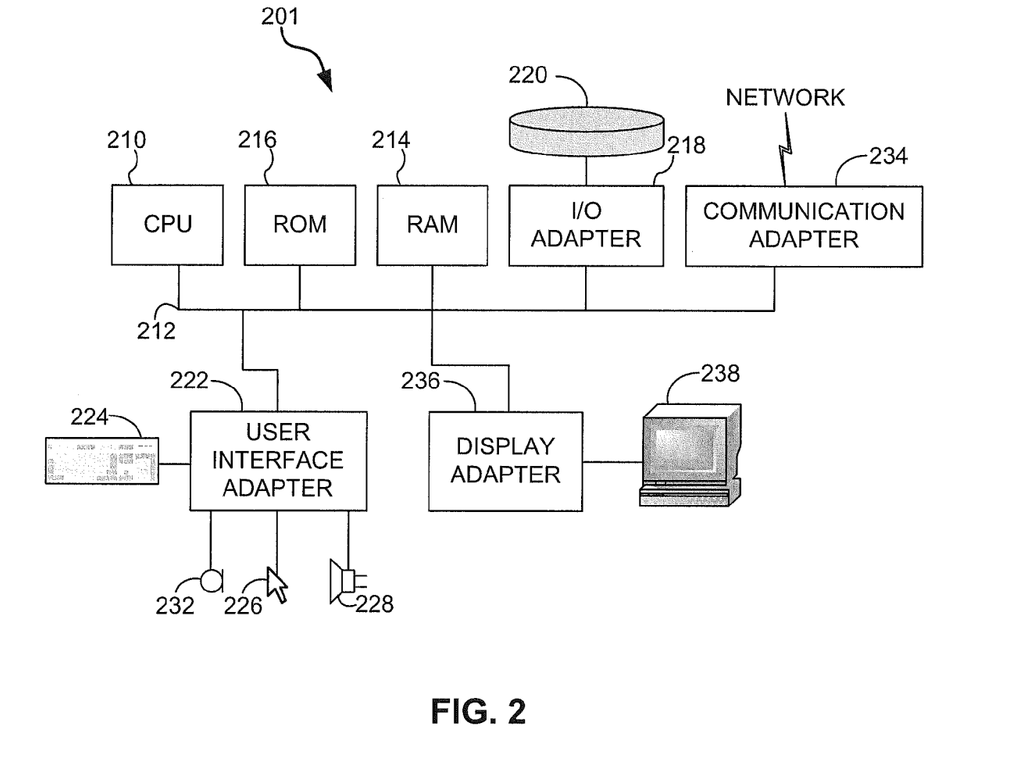
FIG. 2 shows a representative hardware environment that may be associated with the servers and/or clients of FIG. 1, in accordance with one embodiment.

FIG. 2 shows a typical hardware environment, such as a workstation 201, associated with a user device 116 and/or server 114 of FIG. 1, in accordance with one embodiment. As noted above, the user device 116 may comprise a desktop computer, lap-top computer, hand-held computer, printer, or any other type of similar logic device. In one embodiment, the user device 116 and/or server 114 may comprise any computer or computing system, such as a computing device or machine, that is capable of receiving input, such as data or data signals, is capable of storing and/or manipulating data, and providing output, such as data or data signals. Such a typical workstation 201 may comprise a central processing unit 210, such as a microprocessor, and a number of other units interconnected via a system bus 212.

As shown in FIG. 2, the workstation 201 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation 201 may have resident thereon a known operating system for running computing applications on the workstation 201. One of the purposes of an operating system is to handle resource allocation and access protection of the hardware. It will be appreciated that a preferred embodiment may be implemented on any suitable operating platform or operating system. A preferred embodiment may be written using JAVA, XML, C, and/or C++ language, or other programming languages, along with an object oriented programming methodology. Object oriented programming (OOP), which has become increasingly used to develop complex applications, may be used.

According to some preferred embodiments, three document readerships are considered: search engines, customers, and peers. Observations and methods can be applied to other readerships as well, but these three readership classifications render good results when applied to a document set.

A document that is written or composed for attracting search engines generates text for the purpose of attracting search engines, not human beings. Such a document usually contains a set of commonly used web search keywords. These keywords are commonly put together with no logical English meaning. Below is a sample document that is intended for search engines (e.g., the intended readership of this document is search engines):

refinancing career development loans cash advance loans cash back credit cards cheap rate loans college education loans commercial loans commercial mortgage commercial refinancing compare credit cards compound interest calculator conversion rates corporate finance corporate loans credit cards for poor credit cards loans currency exchange rates debt consolidation loans fast loans finance jobs financial loans find loans fixed rate mortgage foreign exchange rates government Documents that have an intended readership for customers usually are published by companies to announce their new products, services, locations, awards, etc. These documents generally include information which is beneficial to the company publishing the document. The goal of such documents is to attract more customers. Below is a sample document which is intended for customers (e.g., the intended readership of this document is customers):

The product software is designed to convert proprietary files to open source files. Company A, a premier provider of data recovery software & data care products, launches a recovery product for the product software to convert proprietary files to open source files for use with the product software. The recovery product for converting proprietary files to open source files for the product software at Company A is a complete conversion product to convert inaccessible proprietary files to open source files. When a server crashes or when a mailbox is deleted from the server, the proprietary files become inaccessible and remain on the user's computer holding large parts of emails, calendar, journals, notes, contacts, tasks, etc.

Documents that have an intended readership for peers usually are written by individual persons to express their opinions, feelings, ideas, etc. The goal of such documents is to share opinions with other persons, and generally no business relationship is involved. Below is a sample document for peers (e.g., the intended readership of this document is peers):

we have a financial plan and we agree on how money is spent. optionally, what you need to do is call around and find the going rates for auto loans. call up credit unions, banks, corporate specific financial organization (if you or your parents are/were employees, you can be a member—and they have really good service/rates), and also the dealer Recognizing document readerships before doing text analytics can save time, effort, and may provide better results. Otherwise, the analysis result can be significantly affected. For instance, as shown above, documents intended for search engines that contain a set of commonly used web search keywords, that are commonly put together with no logical English meaning, will significantly change the word frequency distribution and thus affect the result of any analysis based on word frequency. Also, since documents for customers always say positive words about a company's products and services, this type of document will significantly affect the result of sentiment analysis.

According to some embodiments, methods and computer program products are provided that identify document readerships. There are two major challenges to address: 1) subject-independence, e.g., how the classifier can be applied to documents in any subject domain; and 2) efficiency, e.g., how the classifier can be executed efficiently. Since many text analytics are on-the-fly operations, the classifier may also be executed on-the-fly.

One difficulty is that conventional document classifiers are subject-specific (e.g., IT, Health, Finance). Conventional document classifiers classify documents for each subject domain, which may have its own word frequency distribution. However, such an observation is not useful for the document readership classification problem.

Two interesting observations are noted herein regarding document classification: 1) stop words are useful for document readership classification; and 2) word associations are useful for document readership classification. Based on these observations, a new classification method has been developed to classify document readerships. Experimental results show that this unique method can approach about 95% accuracy, when analyzing real Internet data.

According to some embodiments, stop words can be used to help determine a classification of a document. Stop words, also known as noise words, are words that are filtered out prior to processing of natural language data and information analytics. Usually, prepositions, pronouns, conjunctions, interjections, and/or some adverbs are considered stop words. For instance, "I", "the", "an", "and", "to", "in", etc., are stop words. On the other hand, nouns, verbs, adjectives, and adverbs are generally not considered as stop words. There are many different ways to classify stop words, and any stop word list used in the art may be used in conjunction with the classifying methods disclosed herein, and the methods disclosed herein are not limited to the brief examples of stop words provided above.

In conventional document classification, stop words are not beneficial and confuse the analytical results. Stop words provide noise and are removed before running the classification algorithms. However, it has been determined that in the classification methods disclosed herein, according to some embodiments, stop words can be useful. In particular, the following observations have been made for stop words.

Observation 1.1

Documents for search engines usually do not contain stop words, since stop words are not content-specific words that can direct a search engine toward a desired result based on a search string entered into the search engine. Documents with logical sentences must contain stop words in order to be coherent, and therefore documents with more stop words are generally not targeted for search engines.

Observation 1.2

Documents for customers and peers both contain stop words; however, their stop-word vocabularies are different.

Documents for peers often contain:
  Personal pronouns like I, my, me, we, us, our, you, your, he, her, etc.
  Personal acronyms and shorthand: lol, bff, btw, fyi, omg, ppl, pls, u, cuz, doesnt, couldnt, shld, gonna, wanna, kinda, congrats, yw, etc.
  Personal interjections and adverbs: wow, hmm, oops, ouch, hi, hello, hey, ok, okay, etc.
These personal stop words are generally not used in documents targeted for customers.

Observation 1.3

The above observations are subject-independent, e.g., the subject of the document does not affect whether the above observations held true.

In one embodiment, Observation 1.1 can be used to identify documents for search engines. In another embodiment, Observation 1.2 can be used to classify documents for customers and for peers. In another embodiment, Observation 1.3 shows that it is possible to build a subject-independent classifier using Observation 1.1 and Observation 1.2.

In Observation 1.2, the difference between documents for customers and documents for peers is although documents for customers can belong to various subject domains, such documents are often written in a formal tone with a set of commonly used words, such as "launch", "release", "announce", etc.

It has been shown that word frequency on single words may not be representative enough, e.g., personal blogs may also often use the words "launch", "release", "announce". On the other hand, word association (i.e., a set of words combined together) can be fairly representative throughout a document. For instance, the following several company announcements provide an example.

1) Company Alpha is one of the world's leading suppliers of industrial computing hardware in Taiwan.
2) Corporation Beta is a leading supplier of Single Board Computers and focuses on developing the most advanced and reliable products.
3) XYZ, Inc., a leading provider of source-code analysis tools.
4) Gamma Ltd. is a leading independent provider of Internet comparison shopping services in the UK.
5) Epsilon Corp. is a leading global provider of application access and virtualization solutions.

From this example, it can be seen that the word association "leading . . . supplier" and "leading . . . provider" are often commonly used in documents written for customers. Such representative word association patterns are subject-independent and can be used to build a document readership classifier method, in some embodiments.

Based on Observations 1.1 and 1.2, two rule-based classification methods have been developed. The first method is used to identify documents for search engines, according to one embodiment. The second method is used to classify documents for customers and peers, according to another embodiment. Based on Observation 2, a pattern-based classification method has also been developed to classify documents for customers and peers, according to one embodiment.

In one embodiment, a method for classifying documents according to their intended readerships includes determining an intended readership of the document. The readership may be one of the following: search engine readership; customer readership; and peer readership. This method may be combined with other methods described herein.

In one embodiment, determining an intended readership of the document may be at least partially based on using at least one of a number and a type of stop words contained in the document, and a number and a type of word associations contained in the document.

Figure 6:
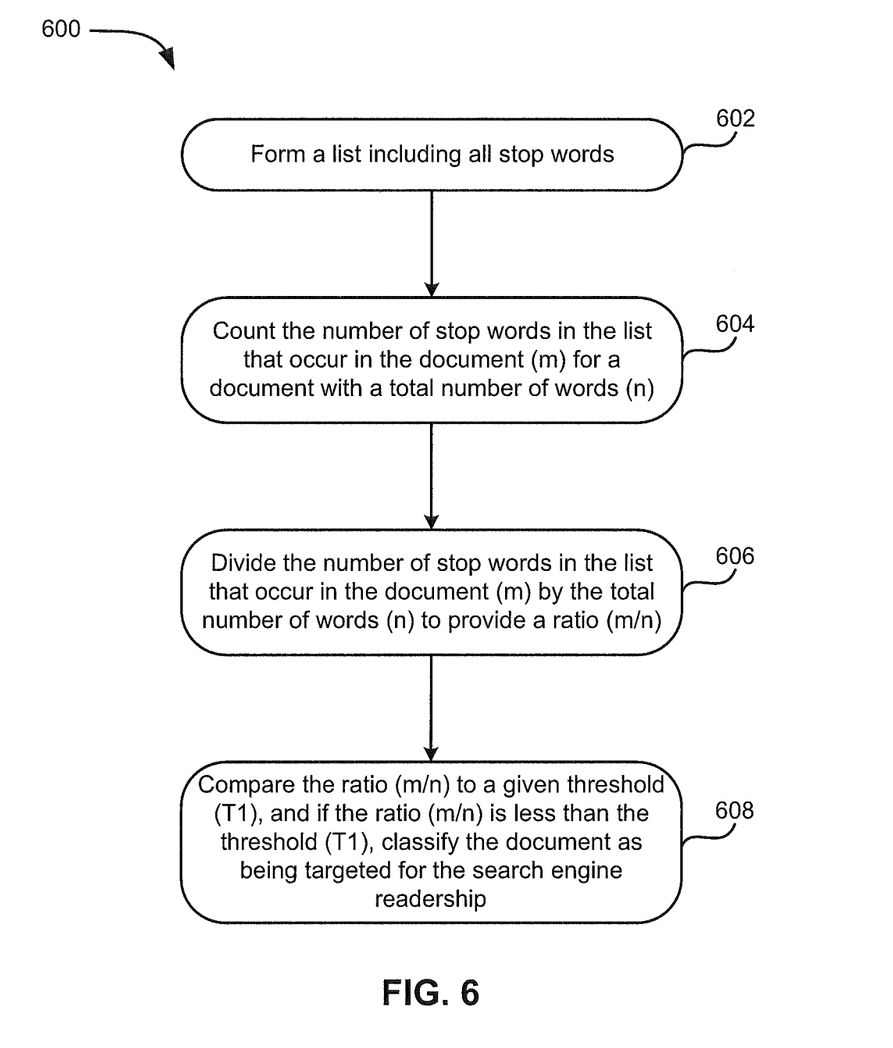
FIG. 6 is a flow diagram showing a method for classifying a document based on a stop word list, according to one embodiment.

Referring to FIG. 6, a method 600 for classifying a document based on a stop word list is shown. The method 600 may be carried out in any desired environment and may include additional operations not shown.

In operation 602, a list that includes all stop words is formed. The list may be in a spreadsheet format, it may be a tab-delimited list, it may be a comma-delimited list, it may be stored in a computer language, etc. The list may also be a string of values which correspond to a predetermined or randomly determined word list, such that the list does not include words but instead includes values. This list includes all known stop words, and may be adjusted to include more stop words or less stop words, depending on the level of accuracy desired by the user and the processing capabilities of a system executing the method.

In operation 604, the number of stop words in the list that occurred in the document are counted (m) for a document with a total number of words (n). There may be more than one list, such that some lists include more stop words and therefore return a greater number of "hits", when the number of words on the list are counted in the document. Alternatively, some lists may include less stop words such that they return less hits when the number of stop words on the list are counted in the document. In this way, the amount of stop words counted may be adjusted at a user's discretion.

In operation 606, the number of stop words in the list that occurred in the document (m) is divided by the number of words in the document (n) to provide a ratio (m/n).

In operation 608, the ratio (m/n) is compared to a given threshold (T1), and if the ratio (m/n) is less than the threshold (T1), then the document is classified as being targeted for the search engine readership. In some embodiments, the threshold (T1) may be set as 0.1, because an average sentence length is about 10 words, and it is assumed that there is at least one stop word in each sentence. However, any other value may also be used for the threshold (T1), such as 0.05, 0.15, 0.25, etc.

In some embodiments, the stop word list may be prepared using an online stop word list. One example of a word list is WORDNET. WORDNET is a large lexical database of English developed and hosted by Princeton University.

Figure 3:
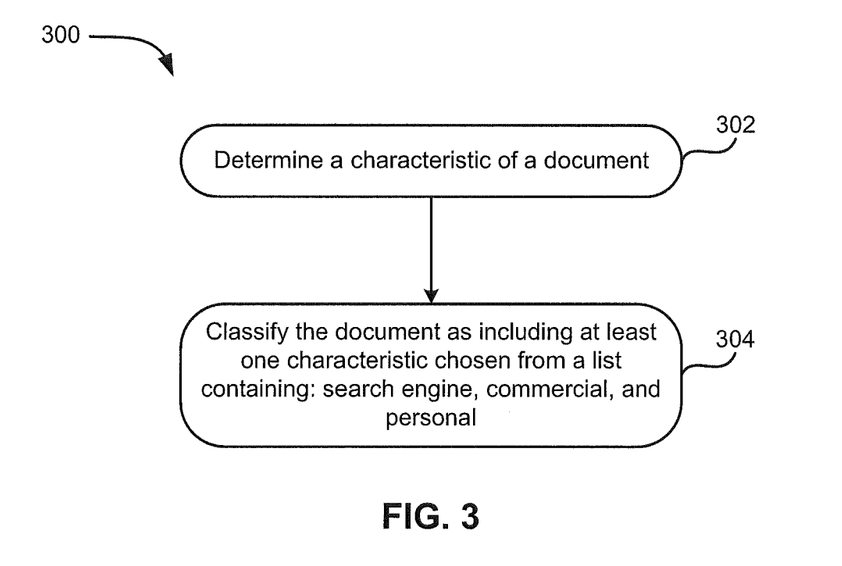
FIG. 3 is a flow diagram showing a method for classifying a document according to its intended readership, according to one embodiment.

Referring to FIG. 3, a method 300 for classifying a document according to its intended readership is shown. The method 300 may be carried out in any desired environment and may include additional operations not shown.

In operation 302, a characteristic of a document is determined. According to one embodiment, the characteristic may be: misleading, when the document includes features that pretend to be for a purpose other than reading the document (closely related to a document targeted at a search engine readership); commercial, when the document includes features which are presented for a legitimate commercial purpose (closely related to a document targeted at a customer readership); and personal, when the document includes features of a personal opinion (closely related to a document targeted at a peer readership).

In operation 304, the document is classified as including the characteristic when it is determined that the document includes the characteristic.

In one embodiment, determining a characteristic of the document further comprises using a stop word list. A method 500 (shown in FIG. 5) may be included as an example of how a stop word list may be used. Of course, any other method of using a stop word list be also be employed in the context and functionality of the present method 300.

In another approach, determining a characteristic is not based on any subject of the document. For example, the subject of the document is not used to determine a characteristic of the document. According to another approach, determining a characteristic of the document may further comprise using word association. In other embodiments, the method 300 may be executed in linear time.

Figure 4:
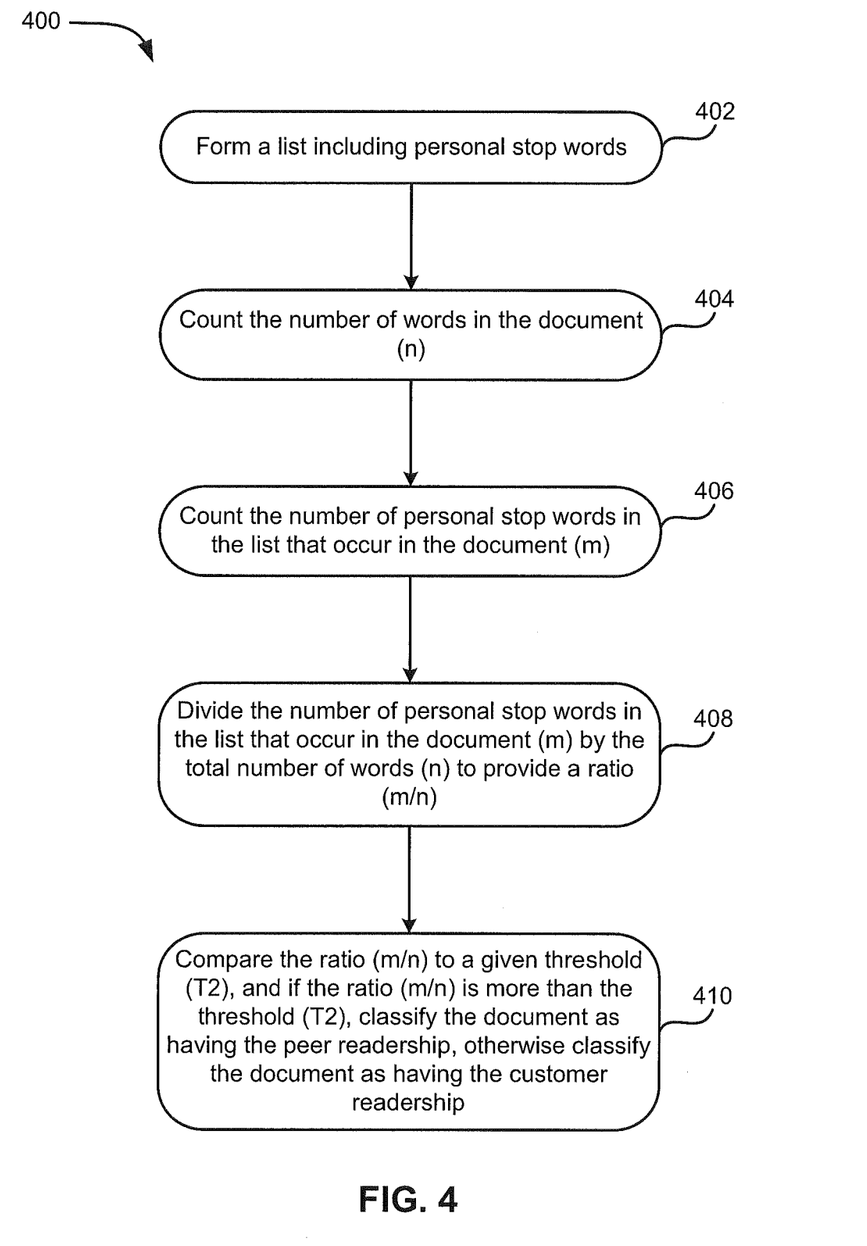
FIG. 4 is a flow diagram showing a method for classifying a document based on a personal stop word list, according to one embodiment.

Referring to FIG. 4, there is shown an embodiment of a method 400 for classifying a document based on a personal stop word list. The method 400 may be carried out in any desired environment and may include additional operations not shown.

In operation 402, a list is prepared that includes personal stop words. In operation 404, the number of words in the document (n) is counted. In operation 406, the number of personal stop words in the list that occurred in the document (m) is counted. In operation 408, the number of personal stop words in the list that occurred in the document (m) is divided by the number of words in the document (n) to provide a ratio (m/n). In operation 410, the ratio (m/n) is compared to a threshold value (T2) such that if the ratio (m/n) is more than the threshold value (T2), the document is classified as having the peer readership, otherwise the document is classified as having the customer readership.

In some embodiments, classifying the document may be at least partially based on a word association pattern. A word association pattern for a given distance (D) is a set of words that occur within a given distance (D) in the document. For instance, in a document including the text " . . . a leading global IT service provider . . . ", the three words "leading", "global", and "provider" occur within a distance (5). According to preferred embodiments, order is not important, so the two segments "leading global company" and "global leading company" are the same.

Figure 5:
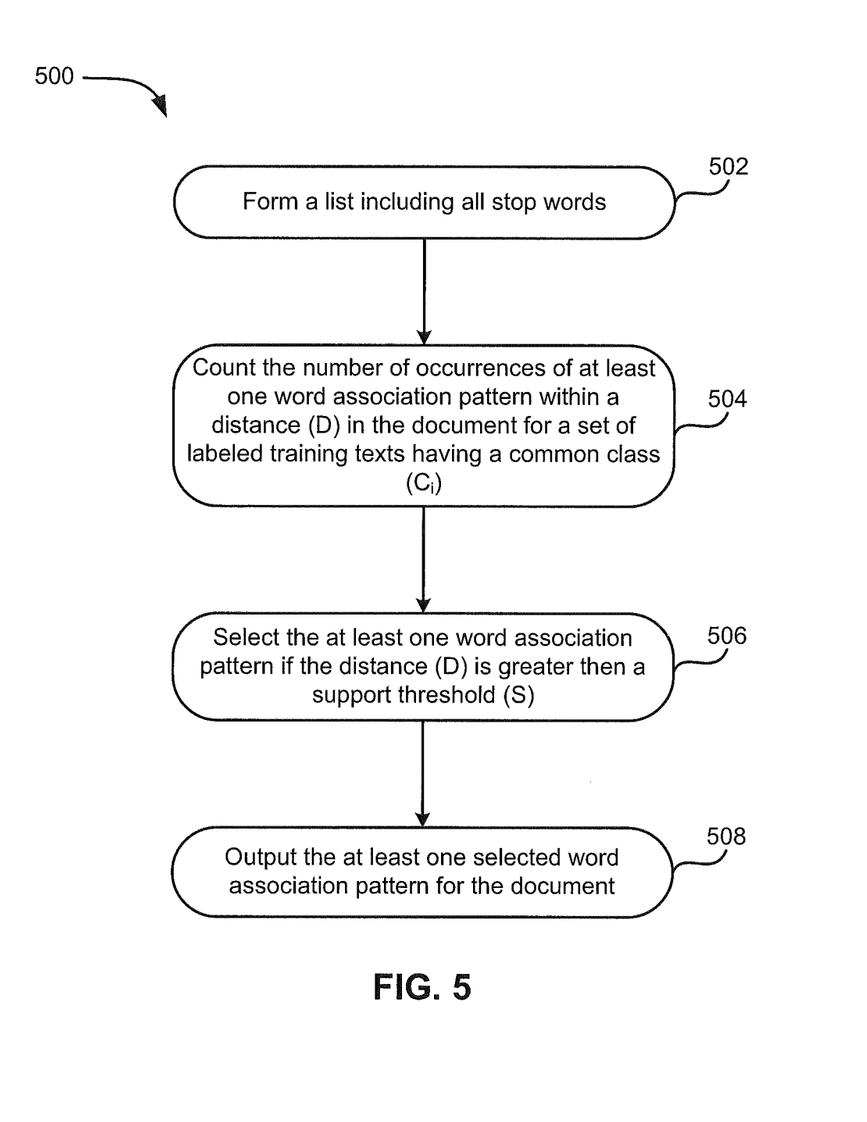
FIG. 5 is a flow diagram showing a method for classifying a document, according to one embodiment.

Methods which make use of word association patterns may have two phases, a training phase and a testing phase, according to some embodiments. The training phase of a method that makes use of word association patterns is used to generate a set of representative word association patterns from a set of labeled training texts. Once the set of representative word association patterns are generated during the training phase, the testing phase then applies the representative word association patterns to classify new documents. Thus, in some embodiments, determining an intended readership of the document may comprise: a training phase, wherein the training phase generates a set of word association patterns from the document based on a set of labeled training texts; and a testing phase, wherein the testing phase applies the word association patterns to classify the document. In further embodiments, the training phase may further comprise another method, method 500.

Referring to FIG. 5, a method 500 for classifying a document according to its intended readership is shown. The method 500 may be carried out in any desired environment and may include additional operations not shown, and may be preferably executed in the context of functionality of method 400, shown in FIG. 4.

Referring again to FIG. 5, in operation 502, a list that includes all stop words is prepared. All descriptions of stop word lists presented previously can be applied here as well. In operation 504, for a set of labeled training texts having a common class ($C_i$), the number of occurrences of at least one word association pattern within a distance (D) in the document is counted. In operation 506, the at least one word association pattern is selected if the distance (D) is greater than a support threshold (S). In operation 508, the at least one selected word association pattern is output for the document.

The testing phase may further comprise classifying the document based on a class having a highest probability value ($Q_i$) for each word association pattern (p) in the document. The highest probability value ($Q_i$) calculated using the following formula:

$$Q_i = \sum_{p \in P} E(p, C_i),$$

where (P) is the set of all word association patterns (p) in the document and where $$E(p,C_i)=O(p,C_i)/\Sigma O(p,C_i),$$

and $O(p, C_i)$ is the number of occurrences of the pattern (p) in class ($C_i$).

$E(P, C_i)$ is defined as the number of patterns (p) that appear in a class ($C_i$), divided by the sum of the number of occurrences of the pattern in every class in the document. For example, if there are three classes C1, C2, C3, and for a pattern (p), the values of the number of occurrences of the pattern (p) in each class C1, C2, C3, are as follows: O(p, C1)=1, O(p, C2)=4, and O(p, C3)=5, then the number of patterns (p) that appear in a class (C), as represented by the function E(P, Ci) is as follows:

$$E(p,C1)=O(p,C1)/(O(p,C1)+O(p,C2)+O(p,C3))$$
$$=1/10=0.1,$$

$$E(p,C2)=O(p,C2)/(O(p,C1)+O(p,C2)+O(p,C3))$$
$$=4/10=0.4,$$

$$E(p,C1)=O(p,C3)/(O(p,C1)+O(p,C2)+O(p,C3))$$
$$=5/10=0.5.$$

In some embodiments, the training phase may be executed off-line. The training phase selects, for each class, all the word association patterns (p) that have an occurrence no less than the support threshold (S). Those patterns, denoted as $p_{ij}$, are representative patterns of class $C_i$.

The testing phase may be executed on-the-fly for a new document. The testing phase computes the weights of the text for each class, denoted as $Q_i$, and classifies the document as into the class with the greatest weight.

For each pattern (p) in the document, its contribution in $Q_i$ is $E(p, C)=O(p, C_i)/\Sigma O(p, C_i)$. If pattern (p) is a representative pattern of class C, $O(p, C_i)$ is the number of occurrences of that pattern. If pattern (p) is not a representative pattern, $O(p, C_i)=0$. If $\Sigma O(p, C_i)=0$, then $E(p, C_i)=0$.

In another example, given a text document (T), an array ($Q_i$) may be defined where all the initial values are equal to 0. Each array ($Q_i$) corresponds to a score of the closeness of the text (T) to the class ($C_i$). The greater the score, the closer the text (T) is to the given class ($C_i$). For each word association pattern (p) in the text (T), the following equations are applied, assuming k classes in total.

$$E(p,C_i)=O(p,C_i)/(O(p,C1)+O(p,C2)+\ldots+O(p,C_k))$$

After the calculations have been performed for each class (up to class k), the text (T) may be classified into a class ($C_i$) with the greatest $Q_i$ value (or score).

A method for classifying a document according to its intended readership may include one or more of the methods 200-600 described above. Also, the method may be carried out in any desired environment and may include additional operations not described above. For example, in a preferred embodiment, a method may include method 600 to initially classify the document's search engine readership, if any is present. Then, the peer readership may be classified using method 400, with a slight modification to operation 410, where if the document is not classified as having the peer readership, the method continues to the next step. In the next step, method 500 may be used to further classify customer readership and peer readership. Of course, these methods may be executed in linear time.

Brand images and reputation are useful marketing tools for corporations, especially consumer facing companies. It is possible (and sometimes not very difficult) for a brand to become tarnished or become negatively associated with a social, environmental, or industry issue. This is especially true with the emergence of new forms of media, such as blogs, weblogs, message boards, web sites, etc. These new media allow consumers to spread information freely and at the speed of thought. By the time publicity has reached the press, it may be too late to protect the brand and only so called "damage control" may be possible.

Clearly, new methods that leverage consumer generated media (CGM) content to generate early warnings on brand and reputation issues are useful. The system described and referenced below monitors brand image and reputation using the following process:

1. Users may use analytical tools such as Business Insights Workbench and domain knowledge to discover potential brand and reputation issues.

2. Users then identify product categories, topics, issues and brands to be monitored, according to step 1.

3. Next, a set of appropriate content sources are identified and analytical models are configured and built for the identified items in step 2.

4. The content sources are configured and ETL'ed into the data warehouse and ingested on an ongoing basis, e.g., daily, hourly, at periodic times during a day, etc.

5. Finally, the alert and event management is enabled to allow users to monitor different types of alerts, e.g., strong signals, weak signals, time-driven, etc.

This system is disclosed in US Patent Publication No. 2009/0119275 to Chen et al. published May 7, 2009, which is hereby incorporated by reference. Disclosed therein, consumer-generated media (CGM) and/or other media are monitored to allow an organization to become aware of, and respond to, issues that may affect how it is perceived by the public. An extract, transform, load (ETL) engine is used to process CGM and other media content, and an analytical engine utilizes a multi-step progressive filtering approach to identify those documents that are most relevant. The filtering approach includes executing broad queries to extract relevant content from different CGM and other sources, extracting text snippets from the relevant content and performing de-duplication, defining organizational identity and hot-topic models using a rule-based and statistical-based approach, and using the models together in an orthogonal filtering approach to effectively generate alerts and reports. The methodology is found to be substantially more effective compared to a conventional keyword based approach.

Unlike traditional text mining or data mining solutions that focus on specific analytics techniques, such as smart information retrieval, Natural Language Processing (NLP) to extract semantic entities out of text (also called "annotation"), clustering, classification, taxonomy generation, and On-Line Analytical Processing (OLAP), the system disclosed in US Patent Publication No. 2009/0119275 embeds a suite of analytics capabilities to allow effective brand and reputation monitoring and alerting, which are specifically designed for blog and web data mining. In addition, this system also includes techniques for fast and continuous extract, transform, and load (ETL) processing for large amounts of semi-structured and unstructured data. This is important since blogs and web content tend to be particularly dirty, noisy, and fragmented. Without special ETL processing, analytics may be meaningless. Web pages may contain banners and advertisements that need to be stripped out. Blogs may contain fragmented sentences, misspellings, and improper grammar. Both web and blogs have many duplicates.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

The invention claimed is:

1. A system for classifying documents in a collection of documents according to their intended readerships, comprising:
  a computer configured to:
    select a document in the collection of documents;
    determine an intended readership of the selected document, the readership being: search engine readership, customer readership; or peer readership;
    classify the selected document as search engine readership, customer readership, or peer readership according to its determined characteristic; and
    repeat the steps of select a document, determine an intended readership of the selected document, and classify the selected document for additional documents in the collection;
  wherein at least some documents of the collection are classified as search engine readership, at least some documents are classified as customer readership, and at least some documents are classified as peer readership; and
  wherein the determining an intended readership of the document comprises:
    preparing a list that includes all stop words;
    counting the number of words in the document (n);
    counting the number of stop words in the list that occurred in the document (m);
    dividing the number of stop words in the list that occurred in the document by the number of words in the document to provide a ratio (m/n); and
    comparing the ratio (m/n) to a threshold value such that if the ratio is less than the threshold value, the document is classified as having the search engine readership.

2. A system for classifying documents in a collection of documents according to their intended readerships, comprising:
  a computer configured to:
    select a document in the collection of documents;
    determine an intended readership of the selected document, the readership being: search engine readership, customer readership; or peer readership;
    classify the selected document as search engine readership, customer readership, or peer readership according to its determined characteristic; and
    repeat the steps of select a document, determine an intended readership of the selected document, and classify the selected document for additional documents in the collection;
  wherein at least some documents of the collection are classified as search engine readership, at least some documents are classified as customer readership, and at least some documents are classified as peer readership; and
  wherein the determining an intended readership of the document comprises:
    preparing a list that includes personal stop words;
    counting the number of words in the document (n);
    counting the number of personal stop words in the list that occurred in the document (m);
    dividing the number of personal stop words in the list that occurred in the document by the number of words in the document to provide a ratio (m/n); and
    comparing the ratio (m/n) to a threshold value such that if the ratio is more than the threshold value, the document is classified as having the peer readership, otherwise the document is classified as having the customer readership.

3. A system for classifying documents in a collection of documents according to their intended readerships, comprising:
  a computer configured to:
    select a document in the collection of documents;
    determine an intended readership of the selected document, the readership being: search engine readership, customer readership; or peer readership;
    classify the selected document as search engine readership, customer readership, or peer readership according to its determined characteristic; and
    repeat the steps of select a document, determine an intended readership of the selected document, and classify the selected document for additional documents in the collection;
  wherein at least some documents of the collection are classified as search engine readership, at least some documents are classified as customer readership, and at least some documents are classified as peer readership; and
  wherein the determining an intended readership of the document is at least partially based on using at least one of: number and type of stop words contained in the document, and number and type of word associations contained in the document, and further comprises:
  a training phase, wherein the training phase generates a set of word association patterns from the document based on a set of labeled training texts; and
  a testing phase, wherein the testing phase applies the word association patterns to classify the document;
  wherein the training phase comprises:
  preparing a list that includes all stop words;
  for a set of labeled training texts having a common class ($C_i$), counting the number of occurrences of at least one word association pattern within a distance (D) in the document;
  selecting the at least one word association pattern if the distance (D) is greater than a support threshold (S); and
  outputting the at least one selected word association pattern for the document.

4. A system for classifying documents in a collection of documents according to their intended readerships, comprising:
- a computer configured to:
  - select a document in the collection of documents;
  - determine an intended readership of the selected document, the readership being: search engine readership, customer readership; or peer readership;
  - classify the selected document as search engine readership, customer readership, or peer readership according to its determined characteristic; and
  - repeat the steps of select a document, determine an intended readership of the selected document, and classify the selected document for additional documents in the collection;
- wherein at least some documents of the collection are classified as search engine readership, at least some documents are classified as customer readership, and at least some documents are classified as peer readership; and
- wherein the determining an intended readership of the document is at least partially based on using at least one of: number and type of stop words contained in the document, and number and type of word associations contained in the document, and further comprises:
- a training phase, wherein the training phase generates a set of word association patterns from the document based on a set of labeled training texts; and
- a testing phase, wherein the testing phase applies the word association patterns to classify the document, wherein the testing phase further comprises:
- classifying the document based on a class having a highest probability value (a) for each word association pattern (p) in the document, wherein $$Q_i = \sum_{p \in P} E(p, C_i),$$

where P is the set of all word association patterns p and where $E(p,C_i)=O(p,C_i)/\Sigma O(p,C_i)$, and $O(p,C_i)$ is the number of occurrences of the pattern p in class $C_i$.

* * * * *